Aug. 8, 1967   R. SCHRODER ETAL   3,334,562
CAMERA WITH DOUBLE EXPOSURE PREVENTING DEVICE
Filed March 25, 1965   2 Sheets-Sheet 2

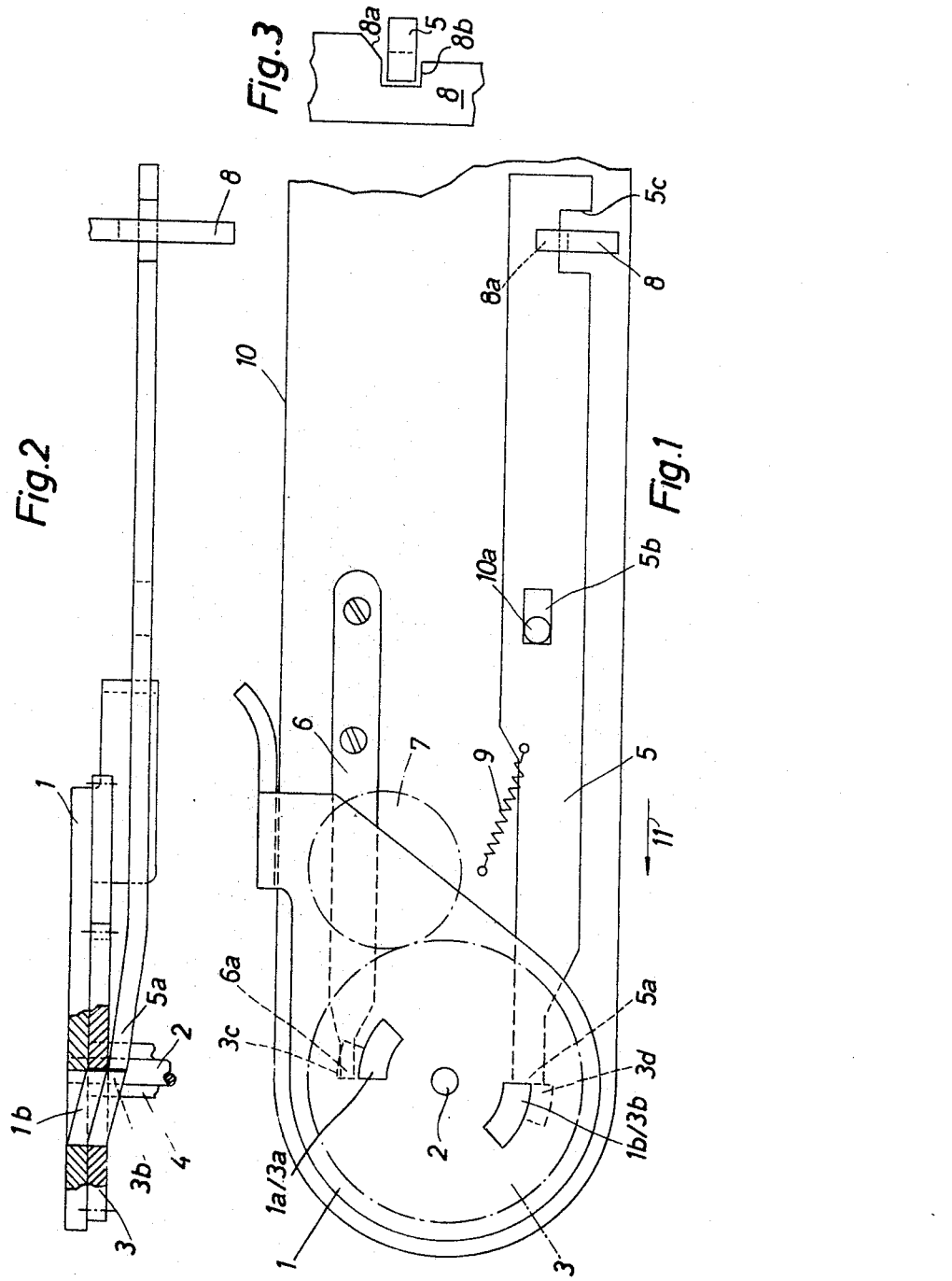

INVENTOR.
ROLF SCHRODER
DIETER ENGELSMANN

United States Patent Office 3,334,562
Patented Aug. 8, 1967

3,334,562
CAMERA WITH DOUBLE EXPOSURE
PREVENTING DEVICE
Rolf Schroder, Munich, and Dieter Engelsmann, Unterhaching, Munich, Germany, assignors to Agfa Aktiengesellschaft, Leverkusen, Germany
Filed Mar. 25, 1965, Ser. No. 442,717
Claims priority, application Germany, Apr. 10, 1964,
A 45,707
8 Claims. (Cl. 95—31)

The present invention relates to cameras.

More particularly, the present invention relates to still cameras which are provided with devices for preventing double exposures.

In cameras of this type there is a film-transporting means which is used to transport the film so that after one frame is exposed the next unexposed frame can be moved into position to be exposed, and also such cameras normally include a shutter release means. The double exposure prevention device cooperates with the film-transporting means and with the shutter release means so as to prevent operation of the shutter release means until after the film-transporting means has been actuated to move the next unexposed frame into position to be exposed, and then the double exposure preventing means prevents further actuation of the film-transporting means until after the shutter release means has been actuated to expose the film.

While structures of this general type are well known, they are exceedingly complex and expensive, particularly at the part of the film-transporting means where a manually operable lever cooperates with the film-transporting means to actuate the latter.

It is therefore a primary object of the present invention to provide a structure of the above type which is far simpler than conventional structures particularly at the point where a manually operable lever of the film-transporting means cooperates with a gear thereof to actuate the film-transporting means.

In addition, it is an object of the present invention to provide a double exposure preventing device which is characterized by extremely simple structure which operates very reliably.

With these objects in view the invention includes, in a camera, a film-transporting means, a shutter-release means, and a means cooperating with the film-transporting means and with the shutter-release means to prevent actuation of the film-transporting means until after the shutter-release means has been actuated and to prevent actuation of the shutter-release means until after the film-transporting means has been actuated. This film-transporting means of the present invention includes a rotary gear member and a coaxial manually turnable lever member, and one of these members is mounted for axial movement toward and away from the other of these members. The lever member and the gear member are respectively formed with projections which terminate in free ends and which are inclined with respect to the lever member and gear member, respectively, and these projections engage each other during manual turning of the lever member in a given direction for transmitting turning of the lever member to the gear member when the lever member is turned in this given direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic top plan view of one possible embodiment of a structure according to the present invention;

FIG. 2 shows in elevation the elements of FIG. 1; and

FIG. 3 shows how a double exposure preventing slide member and the shutter-release means cooperate with each other, FIG. 3 being an end view of the structure of FIG. 2 as seen from the right of FIG. 2;

Figure 4:
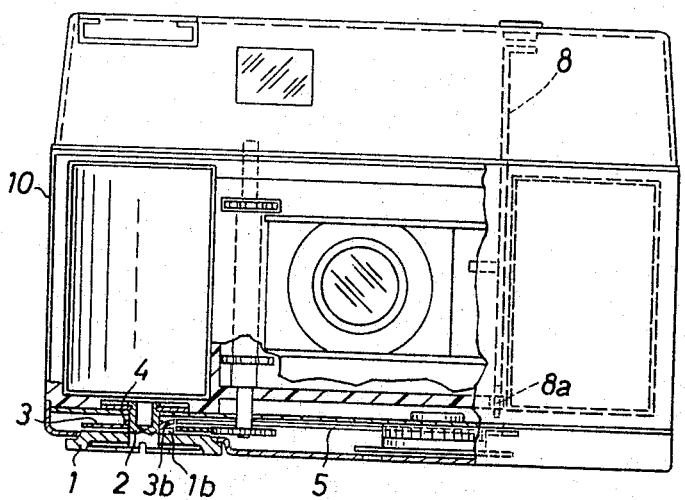
FIG. 4 shows a camera with the structure of FIG. 1.

Referring now to the drawings, there is schematically illustrated therein a camera housing 10. The film-transporting means includes a manually turnable lever member 1 which is fixed to a rotary shaft 2 which is supported for rotary movement in the camera housing by any suitable means such as, for example, by means of the bearing 4 which is schematically illustrated in FIG. 2. The manually turnable lever member 1 of the film-transporting means includes a pair of projections 1a and 1b which are situated at diametrically opposed parts of the lever member 1 and which are in the form of tongues integral with the lever member 1 and struck therefrom so as to be inclined with respect thereto, these projections 1a and 1b terminating in free ends which are displaced from the remainder of the lever member 1.

These projections 1a and and 1b cooperate with a rotary gear member 3 of the film-transporting means, this gear member 3 being situated directly beneath the lever member 1 and being supported for rotary movement by the exterior of the bearing member 4. In addition, the exterior of the bearing member 4 mounts the gear member 3 for axial movement downwardly away from and upwardly toward the lever member 1. The gear member 3 is formed with projections 3a and 3b which correspond to and are substantially identical with the projections 1a and 1b, respectively, and thus these projections 3a and 3b are also in the form of integral tongues struck from the gear member 3 so as to be inclined with respect thereto and so as to terminate in free ends which are displaced from the remainder of the gear member 3. When the lever member 1 is turned in a counterclockwise direction, as viewed in FIG. 1, the projections 1a and 1b can enter into the openings of the gear member 3 formed by the tongues which are struck therefrom, and at this time the projections of the lever member 1 extend coextensively along and engage the projections of the gear member 3, as is particularly apparent from FIG. 2, so that during turning of the lever member 1 by the operator in a counterclockwise direction, as viewed in FIG. 1, the rotary movement of the lever member 1 will be transmitted to the gear member 3 so that the latter turns at this time together with the lever member 1. On the other hand, when the lever member 1 is returned in a clockwise direction, as viewed in FIG. 1, back to the position shown in FIG. 1, the projections 1a and 1b will displace the gear member 3 downwardly away from the lever member 1 until the latter returns to its initial position whereupon the gear member 3 moves back up to its position directly engaging the lever member 1, in a manner described below, and since the projections of the lever member and gear member are displaced by 180° with respect to each other, a cycle of operations of the film-transporting means is completed when the lever member 1 is turned through 180° in one direction and then returned through 180° in the reverse direction, and projections of the lever member and gear member engage each other at the end of each cycle of movement so that during the next turning of the lever member 1 in a counterclockwise direction, as viewed in FIG. 1, the rotation thereof will be transmitted to the gear member 3 so as to transport the film. For this purpose the gear member 3 meshes with a rotary pinion 7 which in turn meshes with additional transmission elements of the film-transporting means, these additional elements including the rotary sprocket member whose teeth enter into the perforations of the film so as to transport the latter by one film frame at each actuation of the manually operable lever member 1.

There is also schematically indicated a shutter release means 8 which normally has the elevation shown in FIG. 3, this shutter release means 8 being yieldably maintained in a known way at this elevation. In order to make an exposure the operator depresses the shutter-release means 8 so that it moves vertically in a downward direction, and after the shutter has been tripped to make the exposure the operator releases the shutter-release means 8 so that it is automatically returned to the elevation shown in FIG. 3.

A means cooperates with the shutter-release means and with the film-transporting means to prevent actuation of the shutter-release means until after the film-transporting means has been operated and to prevent operation of the film-transporting means until after the shutter-release means has been operated. This means which cooperates with the shutter-release means and with the film-transporting means takes the form of a longitudinally shiftable elongated member 5 formed intermediate its ends with an elongated slot 5b which receives a stationary pin 10a fixed to the housing 10, so that in this way the slide member 5 is operatively connected to and supported by the housing 10 for longitudinal shifting movement as well as for turning movement. A spring 9 is operatively connected to the slide member 5 for urging the latter in the direction of the arrow 11 shown in FIG. 1. At its left end the slide member 5 is formed with an upwardly directed springy portion 5a which engages the underside of the gear member 3 to urge the latter upwardly toward the lever member 1.

The gear member 3 is formed at its underside with a pair of detent recesses 3c and 3d, and an elongated detent member 6 cooperates with these recesses so as to prevent turning of the gear member 3 in a clockwise direction when the lever member 1 is turned in a clockwise direction back to its initial position shown in FIG. 1. The elongated detent member 6 is fixed by rivets or screws to the housing 10 and is provided at its left end, as viewed in FIG. 1, with an upwardly directed springy portion 6a which also yieldably presses against the underside of the gear member 3, so that the detent member 6 acts in the same way as the slide member 5 to urge the gear member 3 upwardly toward the lever member 1 while at the same time yielding when the gear member 3 is displaced downwardly away from the lever member 1 by the projections of the latter when the lever member 1 is turned in a clockwise direction, as viewed in FIG. 1. As is apparent from FIG. 1, the slide member 5 and detent member 6 are substantially parallel to each other and are situated on opposite sides of and at substantially equal distances from the shaft 2 so that the axis of the gear member 3 is situated substantially midway between the detent member 6 and the slide member 5.

As is shown most clearly in FIG. 1, the elongated slide member 5 is formed at its right end, as viewed in FIG. 1, with a notch 5c. As is apparent from FIG. 3, the shutter release means 8 is formed with a notch 8b situated at the elevation of the slide member 5 when the shutter release means 8 is in its rest position, and in addition the shutter-release means 8 is formed with an inclined camming surface 8a directed toward the slide member 5 in the position of the parts shown in FIG. 3.

The above-described structure operates in the following manner:

At the end of the transportation of an unexposed film frame into position to be exposed the parts will have the position shown in the drawings. In order to make an exposure the operator will depress the shutter release means 8. As a result the camming edge 8a will engage the inner edge of the notch 5c and will turn the lever 5 in a counterclockwise direction about the pin 10a so that the free end 5a of the slide member 5 will be displaced away from the shaft 2 and beyond the projection 3b with which it is in engagement in the position of the parts shown in the drawing. As soon as the end 5a of the slide member 5 moves beyond the projection 3b the spring 9 pulls the member 5 in the direction of the arrow 11 so that it now becomes located along the outer surface of the projection 3b which is directed away from the axis of the gear 3. However, this movement is relatively slight because the right edge of the notch 5c engages the right surface of the shutter release means 8, as viewed in FIG. 1. However, after the exposure has been completed and the shutter-release means 8 returns to its elevation shown in FIG. 3 the notch 8b will be at the elevation of the slide member 5 so that the spring 9 can now continue the movement of the slide member 5 in the direction of the arrow 11 until the right end of the slot 5b engages the pin 10a, and at this time the portion of the slide member 5 which is situated to the right of its notch 5c, as viewed in FIG. 1, becomes located in the notch 8b of the shutter-release means 8, so that the shutter-release means 8 cannot be actuated at this time. Because the notch 8b is occupied by part of the slide member 5 at this time if the operator should attempt to depress the shutter-release means 8 the slide member 5 will prevent such depression, and thus a second exposure of the frame which was just previously exposed cannot take place.

Therefore, all that the operator can now do is turn the lever member 1 in a counterclockwise direction, as viewed in FIG. 1, with the result that the projections 1a and 1b cooperate with the gear member 3, in the manner shown for the projection 1b and 3b in FIG. 2, as to turn the gear member 3 in a counterclockwise direction, and this will result in movement of the next film frame in position to be exposed. The detent recess 3c is displaced beyond the detent member 6 which yields at this time. When the projection 3b turns beyond the slide member 5, the spring 9 is capable of turning the slide member 5 in a clockwise direction, until the edge of the slide member 5 situated within the notch 8b engages the innermost vertical surface of this notch, and the position of the slide member 5 at this time is such that its free end 5a is situated in the path of turning movement of the projection 3a, so that the free end of the projection 3a, when the operating cycle of the film-transporting means has almost been completed, engages the end 5a of the slide member 5 and displaces the latter in opposition to the spring 9 to the right, as viewed in FIG. 1, until the left end of the slot 5b engages the pin 10a, and now the operator cannot turn the lever 1 further, so that the transportation of the film has been terminated. At this time the gear member 3 will be displaced by 180° from the position thereof shown in the drawings and the projection 3a will occupy the position shown in FIG. 2 for the projection 3b.

In addition, the displacement of the slide member 5 to the right, as viewed in FIG. 1, moves the notch 5c to the position illustrated in FIG. 1 with respect to the shutter release means 8, so that the slide member 5 can assume the position shown in FIG. 1 and in this position the slide member 5 no longer blocks operation of the shutter release means 8, so that in this way after an operating cycle of the film-transporting means has been completed the shutter-release means can be actuated. However, it is to be noted that when it is possible to actuate the shutter-release means 8 further actuation of the film-transporting means is not possible because either the projection 3a or the projection 3b has situated the slide member 5 in the position shown in FIG. 1 where the left end of the slot 5b engages the pin 10a.

Thus, at the end of the transportation of the film the lever 1 has been displaced by the operator in a counter-clockwise direction, as viewed in FIG. 1, through an angle of 180°, and thus at this time the other detent recess 3d receives the free end 6a of the detent member 6. Now the operator returns the lever 1 to its initial position, although, if desired, a spring may be connected to the lever 1 to return it to its initial position, and as a result the projections 1a and 1b turn with respect to the gear member 3 which is now maintained stationary by cooperation of the detent member 6 with one of the detent recesses 3c or 3d. As a result, the projections 1a and 1b turn along the upper surface of the gear member 3 displacing the latter downwardly, and this displacement is greatly facilitated by the inclined positions of the projections of the lever member and the gear member. Thus, during the return of the lever member 1 to its initial position the springy portions 5a and 6a of the members 5 and 6, respectively, will yield while the gear member 3 is displaced downwardly but is prevented from turning by the detent means, and the parts are in this position until the lever member 1 again assumes its initial position, whereupon the pair of projections of the lever member 1 again assume angular positions matching those of the projections of the gear member 3 so that the springy portions 5a and 6a of the slide member and detent member, respectively, can now displace the gear member 3 back up to its position located directly beneath the lever member 1, and thus the parts are again in a position ready for the next cycle of operations.

It will be understood that each of the elements described above, or two or more together, may also find a useful application in other types of cameras differing from the types described above.

While the invention has been illustrated and described as embodied in cameras with double exposure preventing devices, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, film-transporting means, shutter-release means, and means operatively connected to said film-transporting means and shutter release means for preventing operation of said film transporting means until after said shutter release means has been operated and for preventing operation of said shutter release means until after said film-transporting means has been operated, so as to prevent a double-exposure, said film-transporting means including a rotary gear member formed with a projection inclined with respect to said rotary gear member and terminating in a free end and a manually turnable lever member coaxial with said rotary gear and also formed with a projection which is inclined with respect to said lever and terminates in a free end, said projections of said lever member and gear member cooperating to transmit rotation of said lever member to said gear member during manual turning of said lever member in a given direction, and at least one of said members being mounted for axial movement toward and away from the other of said members during turning of said lever member in a direction opposite to said given direction.

2. In a camera, in combination, film-transporting means, shutter-release means, and means operatively connected to said film-transporting means and shutter release means for preventing operation of said film transporting means until after said shutter release means has been operated and for preventing operation of said shutter release means until after said film-transporting means has been operated, so as to prevent a double-exposure, said film-transporting means including a rotary gear member formed with a projection inclined with respect to said rotary gear member and terminating in a free end and a manually turnable lever member coaxial with said rotary gear and also formed with a projection which is inclined with respect to said lever and terminates in a free end, said projections of said lever member and gear member cooperating to transmit rotation of said lever member to said gear member during manual turning of said lever member in a given direction, and at least one of said members being mounted for axial movement toward and away from the other of said members during turning of said lever member in a direction opposite to said given direction, said projections being in the form of tongues integral with and struck from said gear member and lever member, respectively.

3. In a camera, in combination, film-transporting means, shutter-release means, and means operatively connected to said film-transporting means and shutter release means for preventing operation of said film transporting means until after said shutter release means has been operated and for preventing operation of said shutter release means until after said film-transporting means has been operated, so as to prevent a double-exposure, said film-transporting means including a rotary gear member formed with a projection inclined with respect to said rotary gear member and terminating in a free end and a manually turnable lever member coaxial with said rotary gear and also formed with a projection which is inclined with respect to said lever and terminates in a free end, said projections of said lever member and gear member cooperating to transmit rotation of said lever member to said gear member during manual turning of said lever member in a given direction, and at least one of said members being mounted for axial movement toward and away from the other of said members during turning of said lever member in a direction opposite to said given direction, said projections being in the form of tongues integral with and struck from said gear member and lever member, respectively, said tongues being of substantially identical configuration and coextensively engaging each other during rotation of said rotary gear member by said lever member when the latter is turned by the operator in said given direction.

4. In a camera, in combination, film-transporting means, shutter-release means, and means operatively connected to said film-transporting means and shutter release means for preventing operation of said film transporting means until after said shutter release means has been operated and for preventing operation of said shutter release means until after said film-transporting means has been operated, so as to prevent a double-exposure, said film-transporting means including a rotary gear member formed with a projection inclined with respect to said rotary gear member and terminating in a free end and a manually turnable lever member coaxial with said rotary gear and also formed with a projection which is inclined with respect to said lever and terminates in a free end, said projections of said lever member and gear member cooperating to transmit rotation of said lever member to said gear member during manual turning of said lever member in a given direction, and at least one of said members being mounted for axial movement toward and away from the other of said members during turning of said lever member in a direction opposite to said given direction, said gear member being formed with a detent recess; and a detent member extending into said recess for maintaining said rotary gear member stationary when said lever member is turned by the operator in a direction opposite to said given direction.

5. In a camera, in combination, film-transporting means, shutter-release means, and means operatively connected to said film-transporting means and shutter release means for preventing operation of said film transporting means until after said shutter release means has been operated and for preventing operation of said shutter release means until after said film-transporting means has been operated, so as to prevent a double-exposure, said film-transporting means including a rotary gear member formed with a projection inclined with respect to said rotary gear member and terminating in a free end and a manually turnable lever member coaxial with said rotary gear and also formed with a projection which is inclined with respect to said lever and terminates in a free end, said projections of said lever member and gear member cooperating to transmit rotation of said lever member to said gear member during manual turning of said lever member in a given direction, and at least one of said members being mounted for axial movement toward and away from the other of said members during turning of said lever member in a direction opposite to said given direction, said gear member being formed with a detent recess; and a detent member extending into said recess for maintaining said rotary gear member stationary when said lever member is turned by the operator in a direction opposite to said given direction, said means which cooperates with said film-transporting means and shutter release means including an elongated slide member and said detent member being in the form of an elongated member extending parallel to said slide member, the axis of said rotary gear member being situated substantially midway between said detent member and said slide member, said lever member being situated over said gear member and said detent member and slide member respectively having springy portions engaging said gear member at an underside thereof which is directed away from said lever member for urging said gear member toward said lever member.

6. In a camera, in combination, film-transporting means, shutter-release means, and means operatively connected to said film-transporting means and shutter release means for preventing operation of said film transporting means until after said shutter release means has been operated and for preventing operation of said shutter release means until after said film-transporting means has been operated, so as to prevent a double-exposure, said film-transporting means including a rotary gear member formed with a projection inclined with respect to said rotary gear member and terminating in a free end and a manually turnable lever member coaxial with said rotary gear and also formed with a projection which is inclined with respect to said lever and terminates in a free end, said projections of said lever member and gear member cooperating to transmit rotation of said lever member to said gear member during manual turning of said lever member in a given direction, and at least one of said members being mounted for axial movement toward and away from the other of said members during turning of said lever member in a direction opposite to said given direction, said gear member being formed with a detent recess; and a detent member extending into said recess for maintaining said rotary gear member stationary when said lever member is turned by the operator in a direction opposite to said given direction, said means which cooperates with said film-transporting means and shutter release means including an elongated slide member and said detent member being in the form of an elongated member extending parallel to said slide member, the axis of said rotary gear member being situated substantially midway between said detent member and said slide member, said lever member being situated over said gear member and said detent member and slide member respectively having springy portions engaging said gear member at an underside thereof which is directed away from said lever member for urging said gear member toward said lever member, said gear member being the member which is mounted for axial movement and said projections of said lever member displacing said gear member axially away from said lever member in opposition to said springy portions of said detent member and slide member during turning of said lever member in said direction opposite to said given direction.

7. In a camera, in combination, film-transporting means, shutter-release means, and means operatively connected to said film-transporting means and shutter release means for preventing operation of said film transporting means until after said shutter release means has been operated and for preventing operation of said shutter release means until after said film-transporting means has been operated, so as to prevent a double-exposure, said film-transporting means including a rotary gear member formed with a projection inclined with respect to said rotary gear member and terminating in a free end and a manually turnable lever member coaxial with said rotary gear and also formed with a projection which is inclined with respect to said lever and terminates in a free end, said projections of said lever member and gear member cooperating to transmit rotation of said lever member to said gear member during manual turning of said lever member in a given direction, and at least one of said members being mounted for axial movement toward and away from the other of said members during turning of said lever member in a direction opposite to said given direction, said gear member being formed with a detent recess; and a detent member extending into said recess for maintaining said rotary gear member stationary when said lever member is turned by the operator in a direction opposite to said given direction, said means which cooperates with said film-transporting means and shutter release means including an elongated slide member and said detent member being in the form of an elongated member extending parallel to said slide member, the axis of said rotary gear member being situated substantially midway between said detent member and said slide member.

8. In a camera, in combination, film-transporting means, shutter-release means, and means operatively connected to said film-transporting means and shutter release means for preventing operation of said film transporting means until after said shutter release means has been operated and for preventing operation of said shutter release means until after said film-transporting means has been operated, so as to prevent a double-exposure, said film-transporting means including a rotary gear member formed with a projection inclined with respect to said rotary gear member and terminating in a free end and a manually turnable lever member coaxial with said rotary gear and also formed with a projection which is inclined with respect to said lever and terminates in a free end, said projections of said lever member and gear member cooperating to transmit rotation of said lever member to said gear member during manual turning of said lever member in a given direction, and at least one of said members being mounted for axial movement toward and away from the other of said members during turning of said lever member in a direction opposite to said given direction, said means cooperating with said film-transporting means and shutter release means being in the form of an elongated slide member and said projection of said gear member engaging said slide member for moving the latter to a position releasing said shutter release means for operation at the end of an operating cycle of said film-transporting means, said shutter release means displacing said slide member to a position releasing said film-transporting means for operation upon actuation of said shutter release means to make an exposure.

References Cited

UNITED STATES PATENTS 2,231,731  2/1941  Mihalyi _____ 95—31

3,059,556  10/1962  Hell et al. _____ 95—31

OTHER REFERENCES

Batal, German application 1,003,034, printed Feb. 21, 1957 (Kl 57a 22/08).

NORTON ANSHER, *Primary Examiner.*

JOSEPH F. PETERS, Jr., *Assistant Examiner.*